US010050939B2

(12) United States Patent
Hristov et al.

(10) Patent No.: US 10,050,939 B2
(45) Date of Patent: Aug. 14, 2018

(54) TECHNIQUES FOR COMMUNICATION IN HYBRID CLOUD SYSTEM

(71) Applicant: VMware, Inc., Palo Alto, CA (US)

(72) Inventors: Rostislav Hristov, Sofia (BG); Vesselin Arnaudov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 123 days.

(21) Appl. No.: 14/969,988

(22) Filed: Dec. 15, 2015

(65) Prior Publication Data

US 2017/0171157 A1    Jun. 15, 2017

(51) Int. Cl.
*H04L 29/06* (2006.01)
*G06F 9/455* (2018.01)

(52) U.S. Cl.
CPC ...... *H04L 63/0272* (2013.01); *G06F 9/45558* (2013.01); *G06F 2009/45595* (2013.01)

(58) Field of Classification Search
CPC ............ H04L 63/0272; G06F 9/45558; G06F 2009/45595
See application file for complete search history.

(56) References Cited

U.S. PATENT DOCUMENTS

| | | | |
|---|---|---|---|
| 8,856,869 B1 * | 10/2014 | Brinskelle | H04L 63/08 726/12 |
| 9,009,804 B2 | 4/2015 | Abrams et al. | |
| 9,075,663 B2 * | 7/2015 | Zhang | G06F 9/4843 |
| 9,197,489 B1 * | 11/2015 | Vincent | H04L 67/148 |
| 2005/0203962 A1 * | 9/2005 | Zhou | G06F 9/5044 |
| 2007/0008924 A1 * | 1/2007 | Moran | H04L 12/4641 370/331 |
| 2007/0078950 A1 * | 4/2007 | Hopkins | G06F 17/30861 709/217 |
| 2010/0281537 A1 * | 11/2010 | Wang | G06F 9/468 726/22 |

(Continued)

OTHER PUBLICATIONS

"Cross-Origin Resource Sharing W3C, Recommendation, W3C, Jan. 16, 2014", http://www.w3.org/TR/cors/, pp. 1-21.

(Continued)

*Primary Examiner* — Eleni A Shiferaw
*Assistant Examiner* — Sher A Khan
(74) *Attorney, Agent, or Firm* — Thomas | Horstemeyer, LLP

(57) ABSTRACT

Techniques for communication in a hybrid cloud computing system. The techniques include utilizing cross-origin resource sharing to allow a web-based application to communicate with both a public host computer and a private host computer of the hybrid cloud computing system. More specifically, a web-based application downloaded from the public host computer would include code that, when executed, would programmatically make HTTP requests to the private host computer. The private host computer would respond with an Access-Control-Allow-Origin header specifying the origin of the public host computer as an allowed origin, thereby allowing the web-based application to access resources from the private host computer. The techniques may be used for managing computing or software resources of the hybrid cloud computing system and also for transfer of data related to managing computing or software resources of the hybrid cloud computing system.

13 Claims, 5 Drawing Sheets

(56) References Cited

U.S. PATENT DOCUMENTS

| | | | | |
|---|---|---|---|---|
| 2011/0246772 A1* | 10/2011 | O'Connor | ........... | H04L 63/0428 |
| | | | | 713/168 |
| 2012/0072985 A1* | 3/2012 | Davne | ................. | H04L 63/0272 |
| | | | | 726/22 |
| 2012/0179820 A1* | 7/2012 | Ringdahl | ................... | G06F 8/63 |
| | | | | 709/225 |
| 2012/0233657 A1* | 9/2012 | Guevin | ................... | H04L 63/10 |
| | | | | 726/1 |
| 2013/0283364 A1* | 10/2013 | Chang | ...................... | H04L 49/70 |
| | | | | 726/12 |
| 2016/0055038 A1* | 2/2016 | Ghosh | ................. | G06F 9/45558 |
| | | | | 718/105 |
| 2016/0352682 A1* | 12/2016 | Chang | ................. | H04L 61/6022 |
| 2017/0024260 A1* | 1/2017 | Chandrasekaran | . | G06F 9/45558 |

OTHER PUBLICATIONS

"XMLHttpRequest Level 2, W3C Working Group Note, Nov. 18, 2014", W3C, http://www.w3.org/TR/XMLHttpRequest2/, pp. 1-2.
"What are the differences between Service Bus and Virtual network in Microsft Azure in terms of data security?", https://www.quora.com/What-are-the-differences-between-Service-Bus-and-Virtual-network-in-Microsoft-Azure-in-terms-of-data-security#answer_5850892, pp. 1-3.

* cited by examiner

TECHNIQUES FOR COMMUNICATION IN HYBRID CLOUD SYSTEM

BACKGROUND

Hybrid cloud computing systems are used to extend the capabilities of an organization's private data center that manages and executes workloads using computing resources such as virtual machines. A "public" cloud system serves multiple "tenants" and can expand the capabilities of such tenants by providing computing resources to the tenants on demand. For example, a private data center may migrate some virtual machines to the public cloud system for execution in order to free up computing resources for other work. Although convenient, one issue with hybrid cloud computing systems is that communication between the disparate components may be complex. Because the public and private sides of hybrid cloud systems typically do not reside in the same location and/or on the same network, communication between the different components is not always a trivial matter.

SUMMARY

A method for communicating in a hybrid cloud system is provided, where the hybrid cloud system has a public cloud and a private cloud. The method includes executing, in a web application renderer that implements a same-origin policy, a web-based application having, as an origin, a public host computer in the public cloud. The method also includes responsive to determining that the web application renderer is executing in a client device that shares a private network with a private host computer of the private cloud, requesting from the private host computer, an indication that the origin of the web application renderer is an allowed origin of the private host computer. The method further includes receiving an indication that the origin of the web application renderer is an allowed origin of the private host computer. The method also includes transmitting a first communication to the private host computer, the first communication including at least one of data or commands for managing at least one aspect of the hybrid cloud system.

Other embodiments include a system and a non-transitory computer-readable medium storing instructions that, when executed by a processor, cause the processor to perform a method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
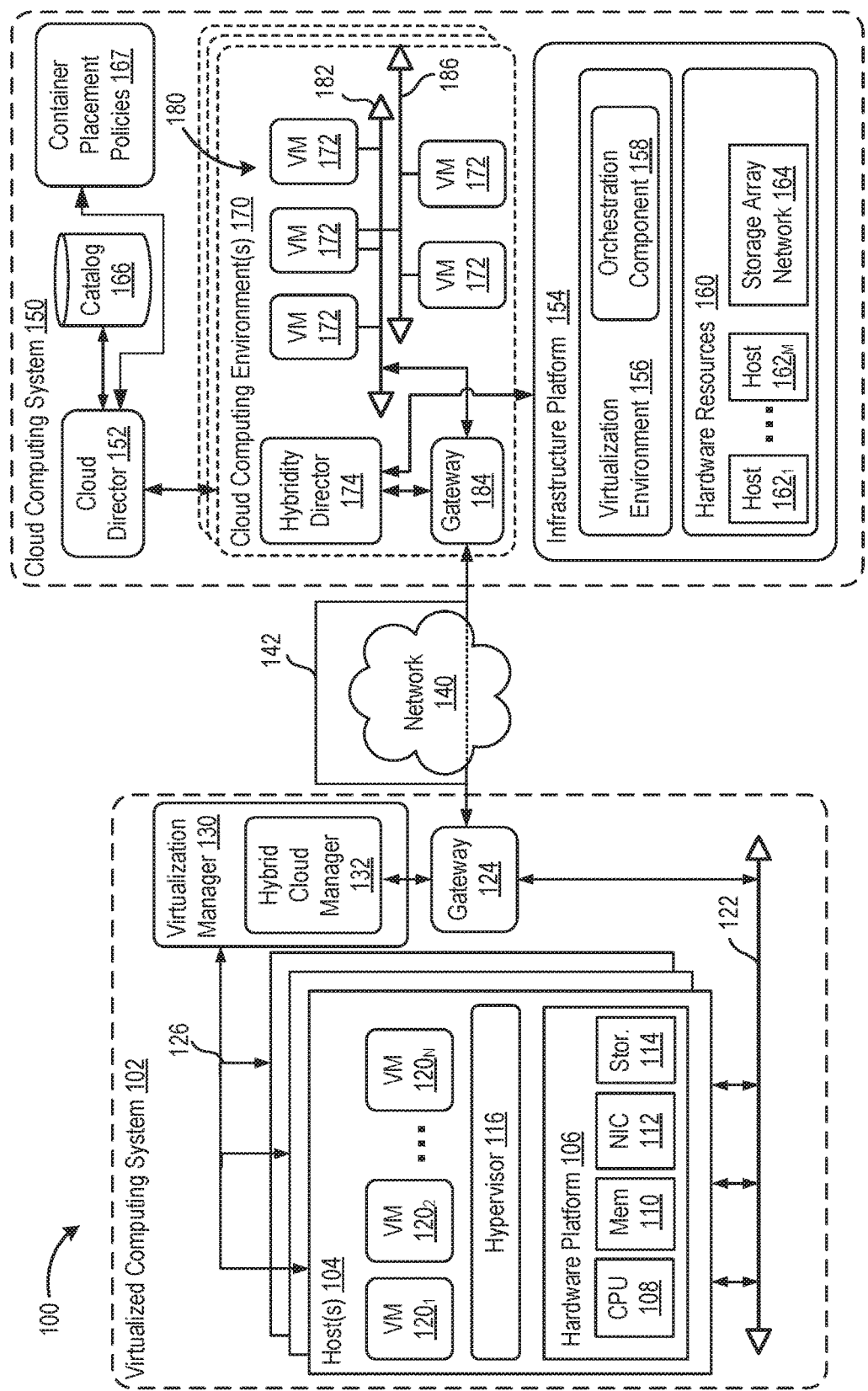
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as an off-premise data center(s). In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtualized execution contexts. The term "virtualized execution contexts" refers to environments in which software, such as applications, may execute and be isolated from other software. Examples of virtualized execution contexts include virtual machines, containers (such as Docker containers), and other contexts. In some embodiments, the virtualized execution contexts are virtual machines, such as virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, may run in a VM in one of hosts 104. One example of a virtualization management module is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120, route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESXT™-based hypervisor technologies provided by VMware, Inc. of Palo Alto, Calif. (although it should be recognized that usage of any other virtualization technologies, including Xen® and Microsoft Hyper-V virtualization technologies is consistent with the teachings herein).

In one embodiment, cloud computing system 150 may include a cloud director 152 (which may be embodied as software running in one or more virtual machines or outside of virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagate such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2(L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

The various components of hardware platform 106 may differ across different host computer systems 104. For example, the processor in one host computer system 104 may belong to the Intel family of processors while the processor in a different host computer system 104 may belong to the AMD family of processors. Processors 108 may also differ in other ways, such as processor speed, architecture bit size, and in other ways.

Figure 2:
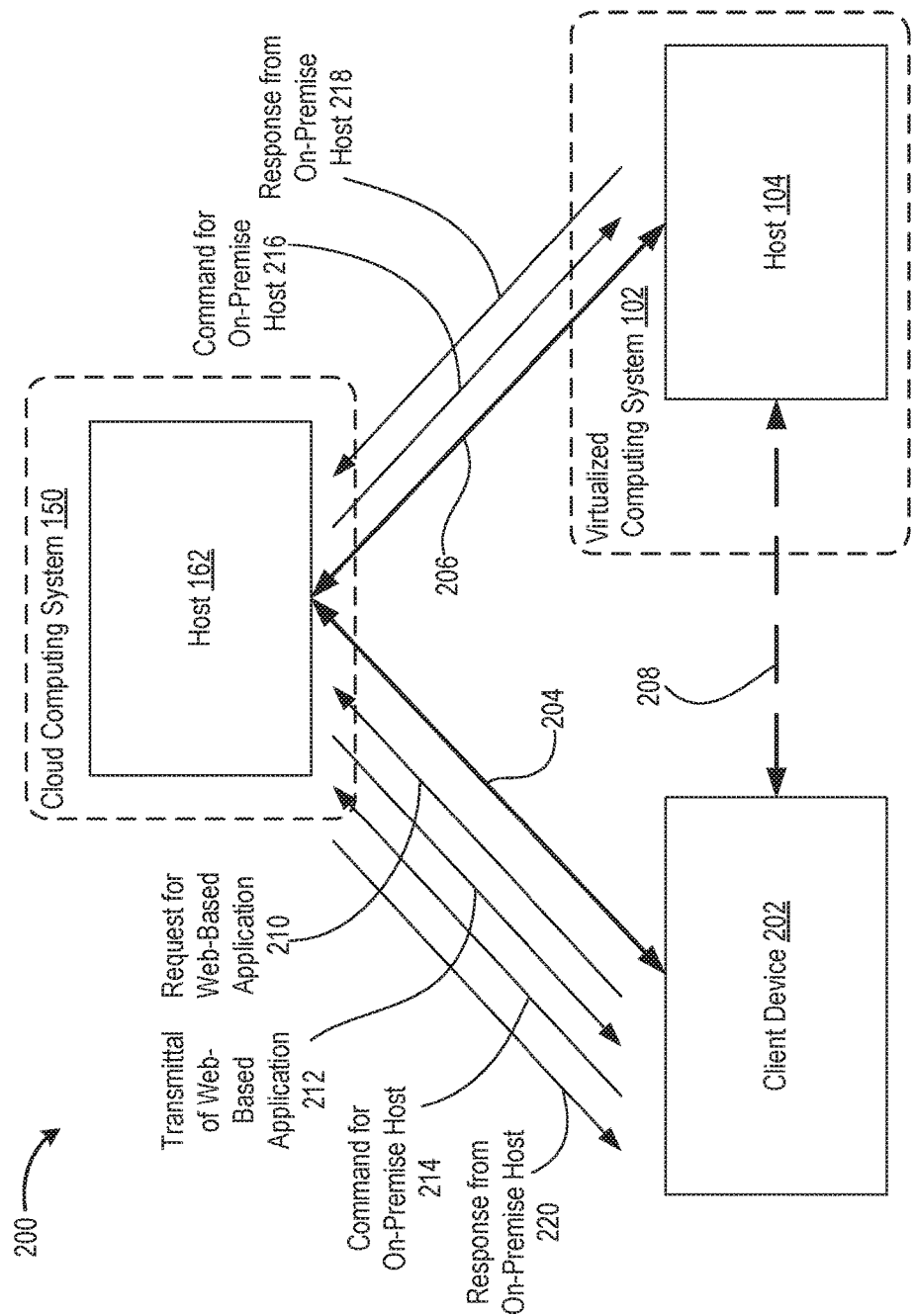
FIG. 2 is a block diagram that illustrates a system for executing web software in the context of a hybrid-cloud computing system, according to an example.

FIG. 2 is a block diagram that illustrates a system 200 for executing web software in the context of a hybrid-cloud computing system, according to an example. In various embodiments, system 200 includes many or all aspects of hybrid cloud computing system 100 of FIG. 1. As shown, system 200 includes a host 104 (also referred to as an "on-premise host") within virtualized computing system 102 (also referred to as "on-premise system" or "on-premise computing system") as well as a host 162 (also referred to as an "off-premise host" or "cloud-based host") within cloud computing system 150 (also referred to as an "off-premise computing system" or "cloud-based computing system"). These hosts are similar to the hosts shown and described with respect to FIG. 1. Host 162 and host 104 are connected via network connection 206, which may be, for example, a connection made via external network 140 or a direct connection 142. Note that although system 200 includes many aspects of hybrid cloud computing system 100 of FIG. 1, many of the elements of FIG. 1 are omitted in FIG. 2 for clarity. For example, although a single on-premise host 104 and a single off-premise host 162 are shown, it should be understood that, as illustrated in FIG. 1, virtualized computing system 102 and cloud computing system 150 may include multiple such hosts. Also, note that although various operations are described as being performed by either a single host in cloud computing system 150 (e.g., the single host shown) or a single host in virtualized computing system 102 (e.g., the single host shown), operations described as being performed by a single host in either cloud computing system 150 or virtualized computing system 102 could alternatively be performed by multiple hosts in cloud computing system 150 or virtualized computing system 102, respectively.

System 200 includes a client device 202. Client device 202 represents a computer system connected to at least host 162, via network connection 204, and optionally also to host 104, via optional network connection 208. Client device 202 may be, for example, a desktop computer, a laptop computer, or another type of computer system that includes computing components such as a processor, memory for storing instructions for execution by the processor, and other components, such as network interface(s), non-volatile storage device(s), input/output device(s), and the like. Client device 202 may have a web browser executing therein, with the capability to execute web-based applications. Note that although sometimes described as being executed in the context of a web browser, the present disclosure also contemplates executing web-based applications in any application that has a rendering engine that renders web-based applications, and that may also render markup content and other media. (Note that the rendering engine may also be referred to as a "web application renderer" herein.). Network connection 204 may be a public connection (e.g., a network connection made over a public network such as the Internet). Network connection 208 may also be a public connection, or may be a private connection, such as a network connection made over a local area network (LAN) or a wide area network (WAN), or another form of network connection.

Host 162 exposes certain web-based functionality of hybrid cloud computing system 100 to client device 202 upon request. This functionality is exposed via a web-based application that client device 202 downloads from cloud-based host 162 and then executes. This configuration may be considered a software-as-a-service configuration, as a (centrally hosted) public cloud is providing software functions on demand. In one example, client device 202 navigates, via a web browser, to a web page that is associated with the web-based functionality and that is hosted by host 162, which causes a web-based application to be downloaded to client device 202 and then executed.

The web-based application may provide any of a wide variety of different types of functionality. In some embodiments, the web-based application allows a user, such as an administrator, to control aspects of the hybrid cloud computing system 100, those aspects including computing resources (such as virtual machines) and aspects of software executing in hybrid cloud computing system 100. In various embodiments, the web-based application exposes one or more of the following types of "core" functionality to a user: creating and editing aspects of virtual data centers, creating and editing aspects of networks, including managing gateways (such as gateway 124 or gateway 184), as well as managing network settings for virtual machines (including assigning virtual machines to networks, and the like), managing compute aspects for virtual machines, including creating, switching on, resetting, suspending, deleting, or changing parameters for virtual machines, monitoring aspects of virtual machines, including monitoring usage, performance, and troubleshooting for virtual machines, as well as other types of functionality. The web-based application may also allow the user to control aspects of applications or other "non-core" functionality for the hybrid cloud computing system 100. For example, the web-based application may expose functionality for changing settings for applications that are to be executed in a virtual machine, for installing or uninstalling such applications, or for performing other tasks.

The web-based application provides the above-described functionality for both on-premise computer system 102 and cloud-based computer system 102. In other words, the web-based application allows an administrator to control aspects of, for example, virtual machines, or of application, executing in off-premise hosts 162, as well as for virtual machines or applications executing in on-premise hosts 104. For functionality of the off-premise computer system 150, the web-based application is able to directly access and utilize information from the off-premise computer system 150 via connection 204. However, there is an obstacle to direct access to information from on-premise computer system. This obstacle is due to a security feature widely implemented in internet web browsers, known as the "same origin policy." The same origin policy is an important concept in the web application security model. Under the policy, a web browser permits scripts contained in a first web page to access data in a second web page, but only if both web pages have the same origin. The policy prevents documents or scripts from one "origin" from getting or setting properties of a document from another "origin." The term "origin" refers to a unique combination of protocol, host, and port, so that "www.example1.com" is a different origin than "www.example2.com" (different hosts) and "http://www.example.com" is a different origin than "https://www.example.com" (different protocols). In the system 200 of FIG. 2, cloud-based host 162 and on-premise host 104 would have a different origin, due at least to being found at different hosts.

This difference in origin means that after client device 202 receives the requested web-based application from the cloud-based host 162 and executes that web-based application, that web-based application cannot access information retrieved directly from on-premise host 104, since the "origin" of the downloaded software is different from the "origin" of information retrieved directly from on-premise host 104. One technique for overcoming this obstacle is shown in FIG. 2.

According to the technique shown in FIG. 2, a user browses to a web page associated with software as a service hosted by the cloud-based computing system 150. The web browser executing on client device 202 browses to a web page, which instructs the client device 202 to request web-based application from the cloud-based host 162 (shown as transaction 210). Cloud-based host 162 transmits the web-based application to client device 202 in transaction 212. The web-based application provides an interface to an administrator, who utilizes the interface to request functionality associated with on-premise host 104. Because of the same origin policy, the web-based application cannot transmit requests directly to on-premise host 104. Thus, instead, the web-based application transmits a command for on-premise host 104 to cloud-based host 162 in transaction 214. Note that the single origin policy is not violated, because the cloud-based host 162 has the same "origin" as the "origin" designated for the web-based application.

Subsequently, cloud-based host 162 transmits the command to on-premise host 104 in transaction 216. On-premise host 104 processes the command, generates a response, and transmits the response back to the cloud-based host in transaction 218. In transaction 220, cloud-based host 162 transmits the response received from the on-premise host 104 back to the client device 202. Again, note that the single origin policy is not violated, since client device 202 communicates with cloud-based host 162, which has the same origin as the web-based application. Note that connection 208 is designated as "optional" in FIG. 2 because communication between client device 202 and on-premise host 104 occurs indirectly, via off-premise host 162.

Note that the technique illustrated in FIG. 2 involves many different "hops." This technique is thus relatively inefficient in terms of speed with which functionality of on-premise host 104 can be accessed by the web-based application. A different technique, illustrated in FIG. 3, is proposed.

Figure 3:
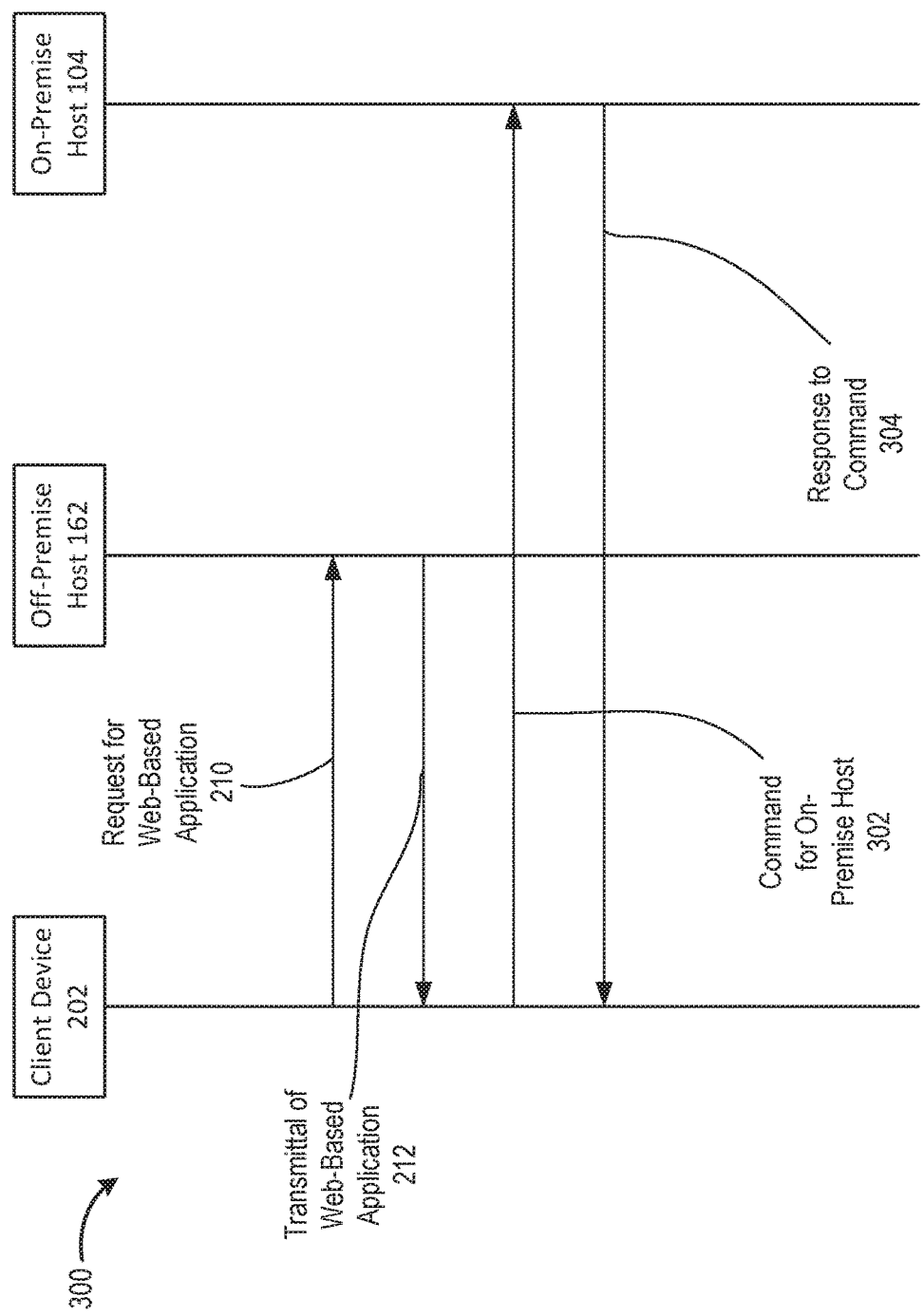
FIG. 3 is a sequence diagram that illustrates a technique for executing web software in the context of a hybrid-cloud computing system, using cross-origin resource sharing, according to an example.

FIG. 3 is a sequence diagram 300 that illustrates a technique for executing web software in the context of a hybrid-cloud computing system, using cross-origin resource sharing, according to an example. The technique may be executed in a system such as system 200. Such a system would include, for example, a cloud-based host 162, a client device 202, and an on-premise host 104. However, because direct communication occurs between client device 202 and on-premise host 104, a connection 208 between on-premise host 104 and client device 202 is not optional.

According to the technique, client device 202 browses to a web page from cloud-based host 162. The web page requests a web-based application for execution on client device 202 to be downloaded in transaction 210. Client device 202 receives the requested web-based application from cloud-based host 162 in transaction 212. Then, using cross-origin resource sharing, client device 202 issues a command to on-premise host 104 in transaction 302 and receives, in response, a response to the command, in transaction 304. The web-based application has the same functionality as what is described above with respect to FIG. 2.

Cross-origin resource sharing is a scheme whereby web-based software can overcome the obstacle of the single-origin policy. Servers, such as on-premise host 104, can allow web-based applications having a different origin to access resources. To do this, when on-premise host 104 receives a communication from client device 202, on-premise host 104 processes the request and returns a response that includes an indication that cloud-based host 162 is an "allowed origin." This indicates to the web browser executing in client device 202 that documents and data received from on-premise host 104 are accessible to a web-based application that has the same origin as the allowed origin. In this manner, the web browser executing in client device 202 "knows" that the web browser can allow the web-based application to access data from the on-premise host.

In some embodiments, cross-origin resource sharing is performed as follows. First, client device 202 transmits an HTTP ("hypertext transfer protocol") OPTIONS request with an "Origin" HTTP header to on-premise host 104. The value of the header is the origin of the web-based application (i.e., the origin associated with cloud-based host 162). In response, on-premise host 104 responds with an HTTP response including an Access-Control-Allow-Origin header that indicates that cloud-based host 162 is an allowed origin. Because this Access-Control-Allow-Origin header has been received from on-premise host 104 by client device 202, the web browser in client device 202 knows that scripts having the same origin as that of cloud-based host 162 are allowed to access resources from on-premise host 104.

Figure 4:
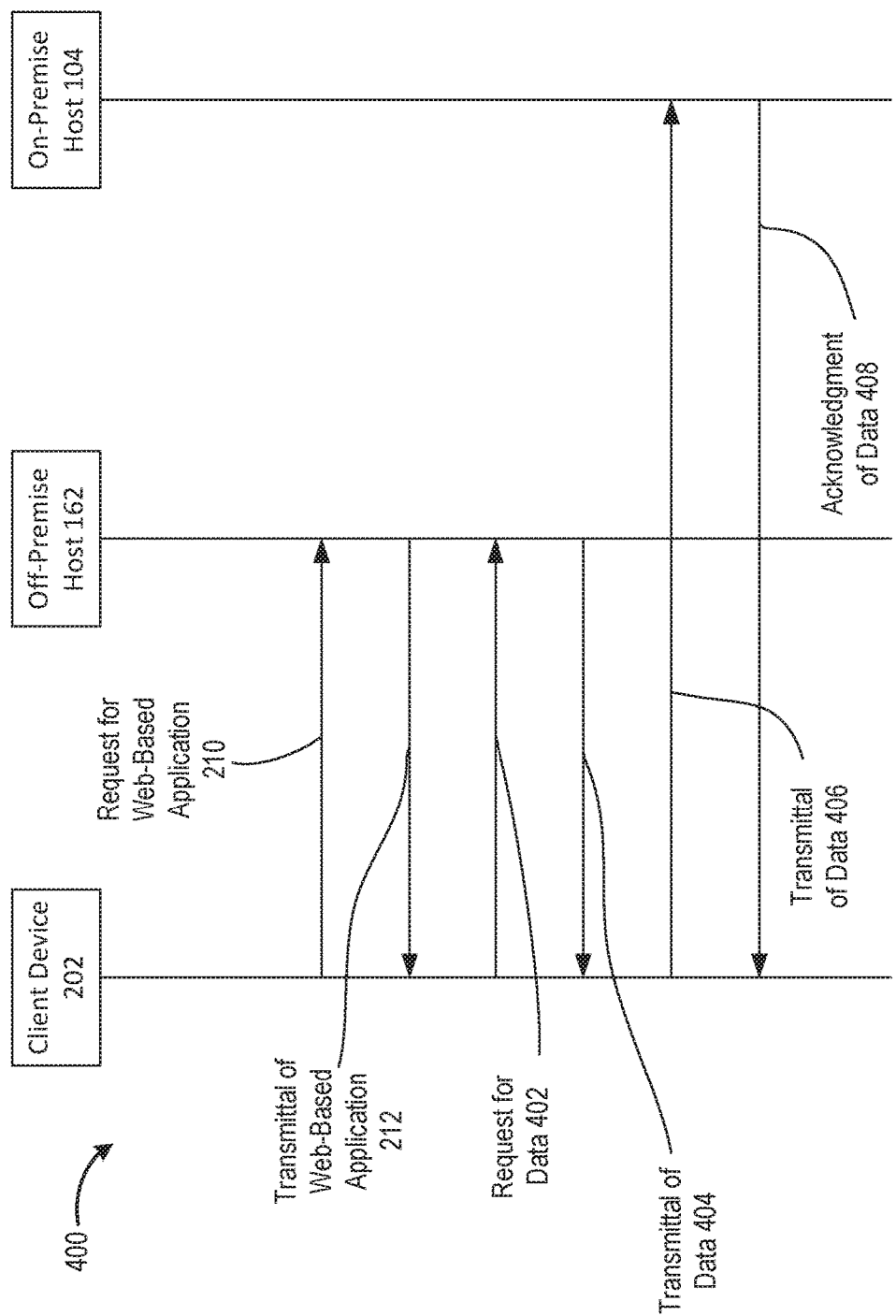
FIG. 4 is a sequence diagram that illustrates a technique for transferring data via web software in the context of a hybrid-cloud computing system, according to an example.

In addition to allowing an administrator to control various aspects of computing resources (e.g., virtual machines) and applications executing within hybrid cloud computing system 100, techniques described herein may also facilitate transfer of various types of data. FIG. 4 is a sequence diagram 400 that illustrates a technique for transferring data via web software in the context of a hybrid-cloud computing system, according to an example. The technique may be executed in a system such as system 200. Such a system would include, for example, a cloud-based host 162, a client device 202, and an on-premise host 104. As with the technique illustrated with respect to FIG. 3, and unlike in FIG. 2, a connection 208 between on-premise host 104 and client device 202 is not optional.

According to the technique, client device 202 browses to a web page from cloud-based host 162. The web page requests a web-based application for execution on client device 202 to be downloaded in transaction 210. Client device 202 receives the requested web-based application from cloud-based host 162 in transaction 212. When executed by client device 202 (e.g., by a web browser), the downloaded web-based application specifies that data should be transferred from (or to) cloud-based host 162 to (or from) on-premise host 104, via the downloaded web-based application. In other words, the web-based application uses client device 202 as a relay to transfer data between on-premise host 104 and off-premise host 162. Moreover, the downloaded web-based application utilizes cross-origin resource sharing.

To perform the data transfer, at the direction of the web-based application, client device 202 transmits, to off-premise host 162, a request for data, at transaction 402. In response, off-premise host 162 transmits the requested data, at transaction 404. The web-based application then transmits the data received from off-premise host 162 to on-premise host 104, utilizing cross-origin resource sharing. In response, on-premise host 104 sends an acknowledgement that the data has been received, at transaction 408.

Note that, to facilitate cross-origin resource sharing, client device 202 may, prior to sending the requested data, send a request asking for on-premise host 104 to indicate which origins are considered "allowed." In response, on-premise host 104 sends an indication that off-premise host 162 is an allowed origin. Thus, the web browser executing in client device 202 would transmit the data received from off-premise host 162 to on-premise host 104, without being hindered by the same origin policy.

There are many scenarios in which the data described with respect to FIG. 4 transfer may be utilized. In one example scenario, the data transfer is used to transfer data related to virtual machines between a cloud-based host 162 and an on-premise host 104. In some embodiments, cloud-based host 162 stores templates for virtual machines. The templates specify settings for a virtual machine, as well as what applications and OS are installed in the virtual machine, and can be used to spawn new virtual machines based on the template. Virtual machine settings may include hardware configuration, such as number of vCPUs ("virtual central processing units"), amount of memory allocated, size of non-volatile storage allocated to the VM, an identification of the virtual network the VM is connected to, an indication of what video hardware resources are allocated to the VM, as well as other settings. The template may also indicate the applications and data that are stored in the non-volatile storage assigned to the VM.

In another example, the web-based application executing on client device 202 exposes functionality that allows for creation of a VM in on-premise host 104, based on a template that is stored in cloud-based host 162. When such functionality is activated, the web-based application requests a VM template from cloud-based host 162 in transaction 402 and receives the requested VM template in transaction 404. Subsequently, using cross-origin resource sharing, client device 202 transmits the VM template to on-premise host 104, which creates one or more VMs using the received VM template (transaction 406).

In yet another example, the data transfer is used for live migration of virtual machines from a cloud-based host 162 to an on-premise host 104. In such an example, the web-based application executing on client device 202 exposes functionality that allows for live migration of a VM between cloud-based host 162 and an on-premise host 104. Live migration refers to movement of a VM from one host to another host (such as from a cloud-based host 162 to an on-premise host 104) while the VM is executing. When this functionality is activated, the web-based application requests the VM state (analogous to request for data transaction 402) from cloud-based host 162, in transaction 402. Cloud-based host 162 transmits that VM state to client device 202 in transaction 404. Client device 202 transmits the state to on-premise host 104 in transaction 406, using cross-origin resource sharing. Subsequently, on-premise host 104 acknowledges the transmittal of the VM state. On-premise host 104 executes the transferred VM and the transferred VM on cloud-based host 162 is shut down.

In still another example, the web-based application executing on client device 202 exposes functionality for file transfer between a cloud-based host 162 and an on-premise host 104. In such an example, the web-based application executing on client device 202 exposes functionality that allows for file transfer from cloud-based host 162 to on-premise host 104. When this functionality is activated, the web-based application requests the file from cloud-based host 162, in transaction 402. Cloud-based host 162 transmits the requested file to client device 202 in transaction 404. Client device 202 transmits the file to on-premise host 104 in transaction 406, using cross-origin resource sharing. Subsequently, on-premise host 104 acknowledges receipt of the file in transaction 408. Such a file transfer may be explicitly requested by an administrator. Alternatively, file transfers may be performed programmatically, as a result of other operations performed by the web-based application.

Various other instances of data transfer may be accomplished. Note that although described going in one direction (i.e., from cloud-based host 162 to client device 202 to on-premise host 104), embodiments where data transfer flows in the opposite direction (i.e., from on-premise host 104 to client device 202 to cloud-based host 162) are also contemplated.

Note that client device 202 may not be on the same private network as on-premise host 104. Because on-premise host 104 may not accept incoming connections over a non-private network, client device 202 may not be able to directly communicate with such an on-premise host 104. A technique is now presented to account for the situation where client device 202 and an on-premise host 104 are not on the same private network.

Figure 5:
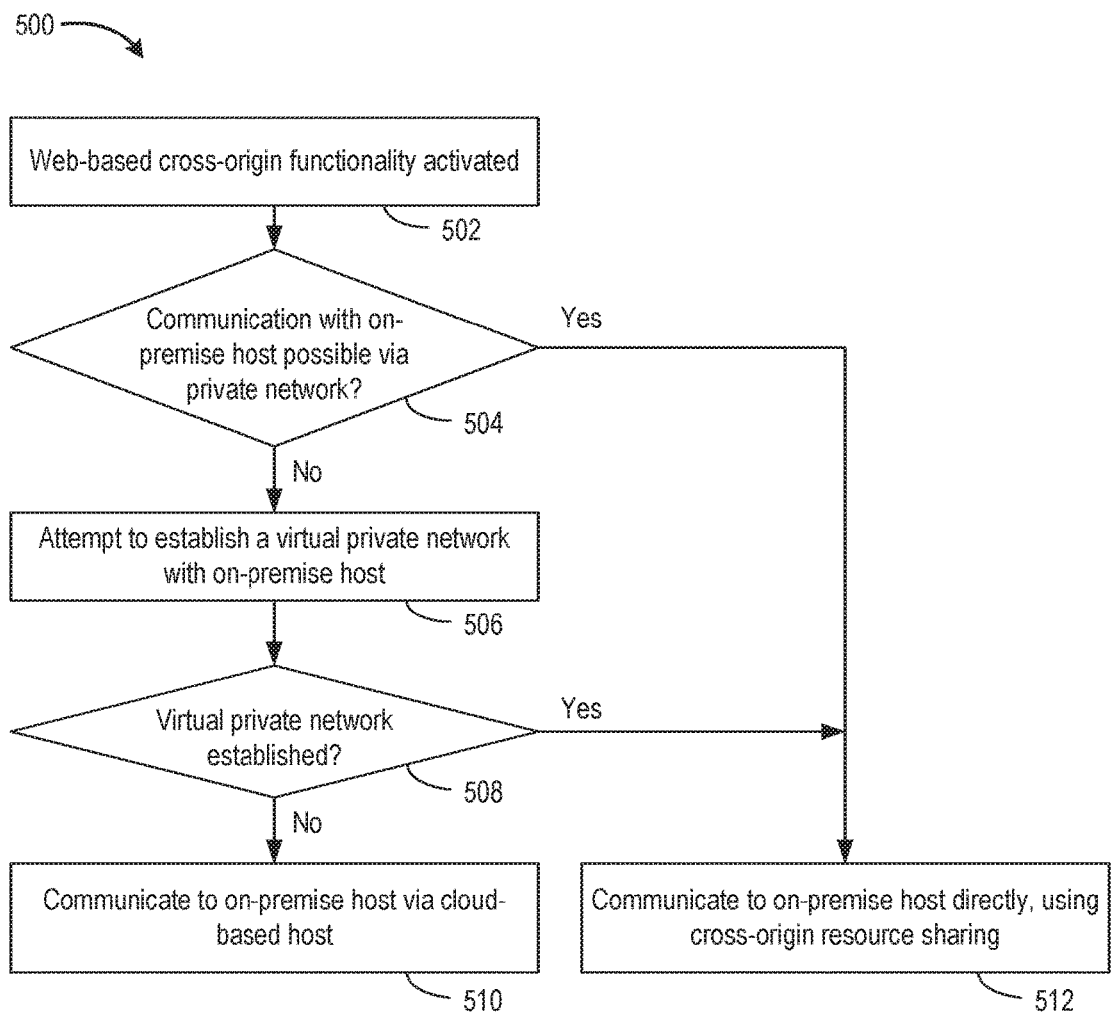
FIG. 5 is a flow diagram of a method for communicating between a client device, a cloud-based host, and an on-premise host in a hybrid cloud computing system, according to an example.

FIG. 5 is a flow diagram of a method 500 for communicating between a client device 202, a cloud-based host 162, and an on-premise host 104 in a hybrid cloud computing system 100, according to an example. Although method 500 is described with respect to the system of FIGS. 1-4, those of skill in the art will recognize that any system that performs the steps of method 500, in various alternative technically feasible orders, falls within the scope of the present disclosure.

As shown, method 500 begins at step 502, where web-based cross-origin functionality is activated at client device 202. Web-based cross-origin functionality comprises functionality initiated or triggered by a web-based application executing on client device 202 (e.g., within a web browser), where information is to be transferred to or received from a host that has a different origin than the origin of the web-based application (i.e., the origin associated with the host from which the web-based application is retrieved). Examples include commands for managing virtualization resources (e.g., resources including to or related to virtual machines), transmission of virtual machine data between hosts of different origins, and transferring files between hosts of different origins.

A step 504, client device 202 determines whether communication is possible with an on-premise host 104 via a private network. More specifically, client device 202 determines whether client device 202 is on the same private network as the on-premise host with which communication is specified to occur by the web-based application downloaded from the cloud-based host. This step occurs because on-premise hosts may not accept incoming communications from outside the private network of the on-premise hosts. For example, the on-premise host may not accept incoming communications via a public network such as the Internet. If communication is possible via a private network (e.g., if the client device and the on-premise host are on the same private network), then method 500 proceeds to step 512 and if communication is not possible via a private network (e.g., if the client device is remote from the on-premise host), then method 500 proceeds to step 506.

At step 506, because the client device is not on the same private network as the on-premise host, the client device attempts to establish a virtual private network connection with the on-premise host. Establishing a virtual private network may be accomplished by connecting to a virtual private network (VPN) server that has a private network connection to the on-premise host and that also accepts incoming connections via a public network (e.g., the internet). The VPN server is able to form a connection between the client device and the on-premise host so that both the on-premise host and the client device believe they are on the same private network. Note that the VPN connection may not succeed, for various reasons. For example, the on-premise data center may not have a VPN server, or the attempt to make a VPN connection may fail.

At step 508, the web-based application determines whether a virtual private network has been established. If a virtual private network has been established, then method 500 proceeds to step 512 and if a virtual private network has not been established, then method 500 proceeds to step 510. At step 510, web-based application communicates to the on-premise host via a cloud-based host. More specifically, web-based application transmits a communication to the cloud-based host, including an indication that the communication is directed to the on-premise host and the cloud-based host relays that communication to the on-premise host. This transmission is similar to the interactions illustrated in FIG. 2.

At step 512, web-based application communicates to the on-premise host directly, using cross-origin resource sharing. More specifically, web-based application transmits a communication to the on-premise host, and in response, the on-premise host processes the communication and sends a response, along with an indication that the origin of the cloud-based host from which the web-based application was downloaded is an allowed origin. For example, the web browser executing the web-based application may transmit an HTTP OPTIONS request with an "Origin" HTTP header having a value of the origin of cloud-based host 162, to on-premise host 104. In response, on-premise host transmits an HTTP response including an Access-Control-Allow-Origin header that includes the value of the origin of cloud-based host 162, to the web browser executing the web-based application.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities —usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for communicating in a hybrid cloud system, the hybrid cloud system having a public cloud and a private cloud, the method comprising:

executing, in a web application renderer that implements a same-origin policy, a web-based application having, as an origin, a public host computer in the public cloud, wherein the web-based application exposes functionality that allows for migration of a virtual machine between the public host computer and a private host computer in the private cloud;

responsive to determining that the web application renderer is executing in a client device that shares a private network with the private host computer in the private cloud, requesting from the private host computer through the private network, an indication that the origin of the web application renderer is an allowed origin of the private host computer;

responsive to determining that the web application renderer is executing in a client device that does not share a private network with the private host computer, forming a virtual private network between the client device and the private host computer and requesting from the private host computer through the virtual private network, an indication that the origin of the web application renderer is an allowed origin of the private host computer;

receiving an indication through the private network or the virtual private network that the origin of the web application renderer is an allowed origin of the private host computer;

receiving virtual machine state for migrating a virtual machine from the public host computer to the private host computer; and transmitting the virtual machine state for migrating the virtual machine from the public host computer to the private host computer.

2. The method of claim 1, wherein the first communication comprises:
a command for controlling an aspect of a virtualized execution environment executing in the private host computer.

3. The method of claim 2, wherein the first communication further comprises:
a command to create or edit an aspect of a virtual data center implemented at least partially by the private host computer.

4. The method of claim 2, wherein the first communication further comprises:
a command to edit computing settings for the virtual machine.

5. The method of claim 2, wherein the first communication further comprises:
a command to control an aspect of an application executing within the virtual machine.

6. The method of claim 1, further comprising:
executing, in a second web application renderer that implements the same-origin policy, the web-based application;
responsive to determining that the web application renderer is executing in a second client device that does not share a private network with the private host computer and that the client device cannot form a virtual private network connection with the private host computer, transmitting a second communication to the public host computer,
wherein, responsive to receiving the second communication, the public host computer forwards the second communication to the private host computer for processing.

7. A client device for communicating in a hybrid cloud system, the hybrid cloud system having a public cloud and a private cloud, the computing device comprising:
a network interface configured to be coupled to a public host computer in the public cloud and to a private host computer in the private cloud;
a processor; and
a memory storing instructions that, when executed by the processor, cause the processor to execute a method, the method comprising:
executing, in a web application renderer that implements a same-origin policy, a web-based application having, as an origin, the public host computer, wherein the web-based application exposes functionality that allows for migration of a virtual machine between the public host computer and a private host computer in the private cloud;
responsive to determining that the client device shares a private network with the private host computer, requesting from the private host computer through the private network, an indication that the origin of the web application renderer is an allowed origin of the private host computer;
responsive to determining that the web application renderer is executing in a client device that does not share a private network with the private host computer, forming a virtual private network between the client device and the private host computer and requesting from the private host computer through the virtual private network, an indication that the origin of the web application renderer is an allowed origin of the private host computer;
receiving an indication through the private network or the virtual private network that the origin of the web application renderer is an allowed origin of the private host computer;
receiving virtual machine state for migrating a virtual machine from the public host computer to the private host computer; and
transmitting the virtual machine state for migrating the virtual machine from the public host computer to the private host computer.

8. The client device of claim 7, wherein the first communication comprises:
a command for controlling an aspect of a virtual machine executing in the private host computer.

9. The client device of claim 8, wherein the first communication further comprises:
a command to create or edit an aspect of a virtual data center implemented at least partially by the private host computer.

10. The client device of claim 8, wherein the first communication further comprises:
a command to edit computing settings for the virtual machine.

11. The client device of claim 7, wherein the method further comprises:
executing, in a second web application renderer that implements the same-origin policy, the web-based application;
responsive to determining that the web application renderer is executing in a second client device that does not share a private network with the private host computer and that the client device cannot form a virtual private network connection with the private host computer, transmitting a second communication to the public host computer,
wherein, responsive to receiving the second communication, the public host computer forwards the second communication to the private host computer for processing.

12. A method for communicating in a hybrid cloud system, the hybrid cloud system having a public cloud and a private cloud, the method comprising:
transmitting computer-executable program code for a web-based application to a client device, wherein the web-based application exposes functionality that allows for migration of a virtual machine between the public host computer and a private host computer in the private cloud, the web-based application having, as an origin, a public host computer in the public cloud, the web-based application, when executed in a web application renderer that implements a same-origin policy, causing the web application renderer to perform a process, the process comprising:

responsive to determining that the client device shares a private network with a private host computer of the private cloud, requesting from the private host computer through the private network, an indication that the origin of the web application renderer is an allowed origin of the private host computer;

responsive to determining that the web application renderer is executing in a client device that does not share a private network with the private host computer, forming a virtual private network between the client device and the private host computer and requesting from the private host computer through the virtual private network, an indication that the origin of the web application renderer is an allowed origin of the private host computer;

receiving an indication through the private network or the virtual private network that the origin of the web application renderer is an allowed origin of the private host computer;

receiving virtual machine state for migrating a virtual machine from the public host computer to the private host computer; and transmitting the virtual machine state for migrating the virtual machine from the public host computer to the private host computer.

13. The method of claim 12, wherein the process further comprises:

executing, in a second web application renderer that implements the same-origin policy, the web-based application;

responsive to determining that the web application renderer is executing in a second client device that does not share a private network with the private host computer and that the client device cannot form a virtual private network connection with the private host computer, transmitting a second communication to the public host computer, wherein, responsive to receiving the second communication, the public host computer forwards the second communication to the private host computer for processing.

* * * * *